United States Patent
Assis et al.

(10) Patent No.: US 9,586,503 B1
(45) Date of Patent: Mar. 7, 2017

(54) VEHICLE SEAT AND TORSION BAR

(71) Applicant: Faurecia Automotive Seating, LLC, Troy, MI (US)

(72) Inventors: Michel Paschoal Quirilos Assis, Paraná (BR); Luiz Iran Batista Witkowski, Paraná (BR); Grzegorz Wojtowicz, Rochester Hills, MI (US); Bruce Gumke, Westland, MI (US)

(73) Assignee: Faurecia Automotive Seating LLC, Troy, MI (US)

( * ) Notice: Subject to any disclaimer, the term of this patent is extended or adjusted under 35 U.S.C. 154(b) by 0 days.

(21) Appl. No.: 14/839,396

(22) Filed: Aug. 28, 2015

(51) Int. Cl.
    *B60N 2/20* (2006.01)
    *B60N 2/22* (2006.01)
    *B60N 2/235* (2006.01)

(52) U.S. Cl.
    CPC ............. *B60N 2/2227* (2013.01); *B60N 2/20* (2013.01)

(58) Field of Classification Search
    CPC ................................ B60N 2/2227; B60N 2/20
    USPC ....... 297/361.1–376, 378.12, 378.14, 354.12
    See application file for complete search history.

(56) References Cited

U.S. PATENT DOCUMENTS

| | | | | |
|---|---|---|---|---|
| 3,663,056 A | * | 5/1972 | Turner | B60N 2/236 297/369 |
| 3,774,964 A | * | 11/1973 | Turner | B60N 2/233 297/361.1 |
| 3,840,268 A | * | 10/1974 | Johndrow | B60N 2/2356 297/366 X |
| 4,178,037 A | * | 12/1979 | Pickles | B60N 2/2352 297/378.12 X |
| 4,218,092 A | * | 8/1980 | Schach | B60N 2/2352 297/367 R |
| 4,294,488 A | * | 10/1981 | Pickles | B60N 2/433 297/367 R |
| 4,384,744 A | * | 5/1983 | Barley | B60N 2/2356 297/367 R X |
| 5,466,048 A | * | 11/1995 | Fowler | B60N 2/366 297/378.12 X |
| 5,547,254 A | * | 8/1996 | Hoshihara | B60N 2/2352 297/378.12 X |
| 6,158,800 A | * | 12/2000 | Tsuge | B60N 2/206 297/378.12 X |
| 6,619,744 B2 | * | 9/2003 | Reubeuze | B60N 2/2358 297/378.12 X |
| 6,629,732 B1 | * | 10/2003 | Ursel | B60N 2/0224 297/362 |
| 7,281,766 B2 | * | 10/2007 | Fujita | B60N 2/22 297/378.12 X |
| 7,527,334 B2 | * | 5/2009 | Kiehler | B60N 2/22 297/362.12 X |
| 7,878,592 B2 | * | 2/2011 | Yamada | B60N 2/22 297/378.12 X |

(Continued)

*Primary Examiner* — Rodney B White
(74) *Attorney, Agent, or Firm* — Reising Ethington P.C.

(57) ABSTRACT

A vehicle seat includes a torsion bar that biases a seat back toward a seat bottom about a pivot axis when in a loaded condition, thereby providing a return force when the seat back is in a reclined position. The torsion bar has a transverse portion that engages a stationary hook. The transverse portion of the torsion bar is oriented at a non-zero angle with respect to the seat pivot axis so that the torsion bar remains engaged with the stationary hook during twisting motion of the torsion bar that occurs with increased torsion bar loading.

20 Claims, 3 Drawing Sheets

(56) References Cited

U.S. PATENT DOCUMENTS

| | | | | |
|---|---|---|---|---|
| 7,878,595 B2* | 2/2011 | Imajou | .................. | B60N 2/3011 |
| | | | | 297/378.12 X |
| 8,360,529 B2* | 1/2013 | Armbruster | ............ | B60N 2/206 |
| | | | | 297/378.12 X |
| 8,517,470 B2* | 8/2013 | Roth | ........................ | B60N 2/20 |
| | | | | 297/362.12 X |
| 8,974,000 B2* | 3/2015 | Navatte | ................ | B60N 2/0232 |
| | | | | 297/362.11 |
| 2002/0125755 A1* | 9/2002 | Frolo | ........................ | B60N 2/22 |
| | | | | 297/367 R |
| 2002/0125757 A1* | 9/2002 | LeTournoux | .......... | B60N 2/366 |
| | | | | 297/378.12 |
| 2003/0025375 A1* | 2/2003 | Gray | ..................... | B60N 2/206 |
| | | | | 297/367 R |
| 2003/0052523 A1* | 3/2003 | Becker | ..................... | B60N 2/20 |
| | | | | 297/378.12 |
| 2003/0080601 A1* | 5/2003 | Charras | .................. | B60N 2/206 |
| | | | | 297/378.12 |
| 2010/0096895 A1* | 4/2010 | Nonomiya | ........... | B60N 2/4228 |
| | | | | 297/367 P X |
| 2011/0156462 A1* | 6/2011 | Lim | ........................ | B60N 2/20 |
| | | | | 297/354.12 |

\* cited by examiner

VEHICLE SEAT AND TORSION BAR

TECHNICAL FIELD

The present disclosure relates to a vehicle seat and, in particular, to a vehicle seat having a torsion bar that assists relative movement between a seat bottom and a seat back.

BACKGROUND

Many vehicle seats are configured to allow selective reclining or other relative movement between the seat bottom and the seat back. Mechanisms actuated either manually or electrically have been developed to either provide or assist with such movement. For example, some seats are equipped with reclining or other locking mechanisms that are configured to selectively allow or prevent relative movement between the seat bottom and the seat back. In mechanically actuated systems, springs are sometimes employed to bias the seat bottom and/or the seat back in a particular direction relative to each other to provide resistance to movement and/or a return force. Retention of such components within the seat assembly in a manner that is simple for manufacturing purposes and that is smooth and quiet during operation can be a challenge.

SUMMARY

In accordance with one or more embodiments, a vehicle seat having opposite inboard and outboard sides includes a seat back pivotably coupled with a seat bottom by a locking mechanism for relative movement toward and away from each other about a transverse pivot axis. The locking mechanism is changeable between a locked position, in which the locking mechanism prevents the seat back and seat bottom from moving relative to each other, and an unlocked position, in which the locking mechanism allows the seat back and seat bottom to freely move relative to each other. The vehicle seat also includes a torsion bar that biases the seat back toward the seat bottom about the pivot axis when in a loaded condition. The torsion bar includes a transverse portion and first and second engagement portions. The transverse portion has opposite first and second ends spaced apart along a torsional axis. The first engagement portion is in a fixed position relative to the seat bottom and radially spaced from the torsional axis by a first lever arm extending from the first end of the transverse portion of the torsion bar. The second engagement portion is in a fixed position relative to the seat back and radially spaced from the torsional axis by a second lever arm extending from the second end of the transverse portion of the torsion bar. The torsional axis and the transverse pivot axis are non-parallel.

The vehicle seat may also include a hook that partially surrounds and engages the transverse portion of the torsion bar to radially constrain the transverse portion of the torsion bar when the torsion bar is in the loaded condition. Where such a hook is included, the torsional axis may form an angle with the transverse pivot axis such that movement of the transverse portion of the torsion bar in a direction from the first to the second end of said transverse portion increases an amount of engagement force between the hook and the torsion bar, and in some embodiments, the torsional axis forms an angle with the transverse pivot axis sufficient to prevent disengagement of the torsion bar from the hook. In various embodiments, the torsional axis forms an angle with the transverse pivot axis in a range between 0.5 degrees and 45 degrees.

According to one or more embodiments, the locking mechanism is a recliner mechanism mounted to the seat bottom via a bracket. When equipped with such a recliner mechanism, the first engagement portion of the torsion bar may be a first end of the torsion bar that bears against the bracket when the torsion bar is in the loaded condition. Additionally, the vehicle seat may further include a hook that extends from the bracket and partially surrounds and engages the transverse portion of the torsion bar to radially constrain the transverse portion of the torsion bar when the torsion bar is in the loaded condition. Movement of the seat back in a reclining direction away from the seat bottom may increase the load on the torsion bar such that, when the seat back is in a reclined position, changing the recliner mechanism from the locked to the unlocked position causes the seat back to move in a return direction toward the seat bottom.

According to one or more embodiments, both ends of the transverse portion of the torsion bar are located on the same inboard or outboard side of the vehicle seat, each of the first and second lever arms are perpendicular to the transverse pivot axis, the first and second lever arms are parallel with each other and oriented in the same direction, and/or the torsion bar is a metal wire with a plurality of bends formed along the length of the wire. One of such bends may be located where the first end of the transverse portion joins the first lever arm, and another of such bends may be located where the second end of the transverse portion joins the second lever arm.

BRIEF DESCRIPTION OF THE DRAWINGS

Preferred exemplary embodiments will hereinafter be described in conjunction with the appended drawings, wherein like designations denote like elements, and wherein.

DETAILED DESCRIPTION

The vehicle seat described herein includes a torsion bar configured to bias a seat back toward a seat bottom about a pivot axis when in a loaded condition, thereby providing a return force when the seat back is moved away from the seat bottom, such as when the seat back is in a reclined position. The torsion bar has a portion that engages a stationary hook and that is oriented at a non-zero angle with respect to the seat pivot axis. This configuration prevents the torsion bar from disengaging from the hook during loading and unloading of the torsion bar during relative movement between the seat back and seat bottom. The angle between the torsion bar and the pivot axis can be configured to increase the engagement force between the hook and torsion bar during increased torsion bar loading.

Figure 1:
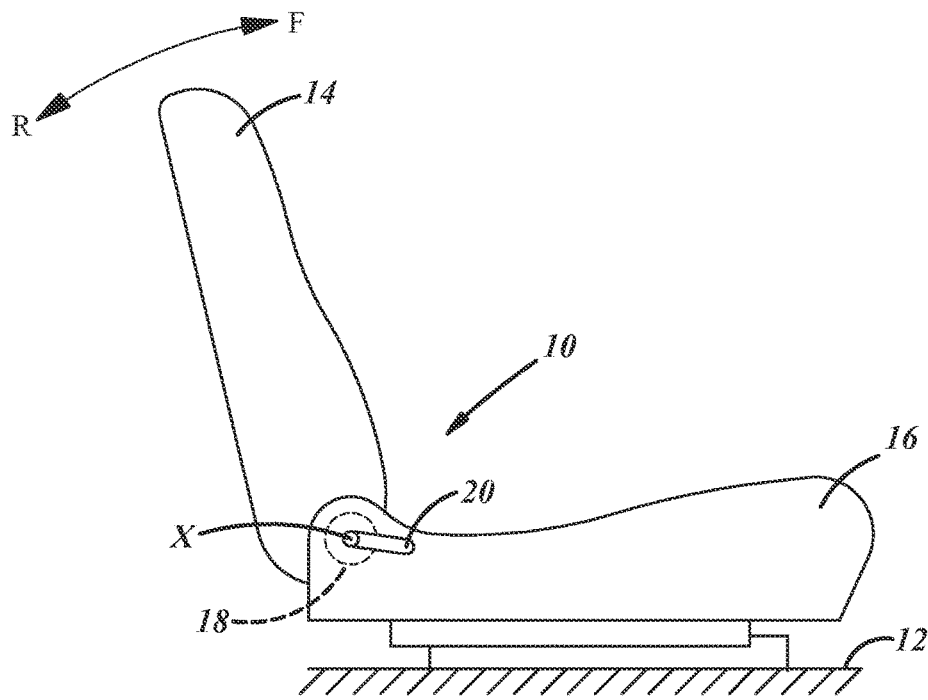
FIG. 1 is a side view of a vehicle seat with a seat back in an upright position.

FIG. 1 illustrates one side of a vehicle seat 10 adapted for mounting to a vehicle floor 12. The vehicle seat 10 has opposite outboard and inboard sides, only one of which is arbitrarily shown in FIG. 1. As mounted in a vehicle, the outboard side is the side closest to the exterior of the vehicle. The seat 10 includes a seat back 14 pivotably coupled with a seat bottom 16 by a locking mechanism 18 for relative movement toward and away from each other about a transverse pivot axis X. The locking mechanism 18 is changeable between a locked position and an unlocked position. In the locked position, the locking mechanism 18 prevents the seat back 14 and seat bottom 16 from moving relative to each other. In the unlocked position, the locking mechanism 18 allows the seat back 14 and seat bottom 16 to freely move relative to each other.

Figure 2:
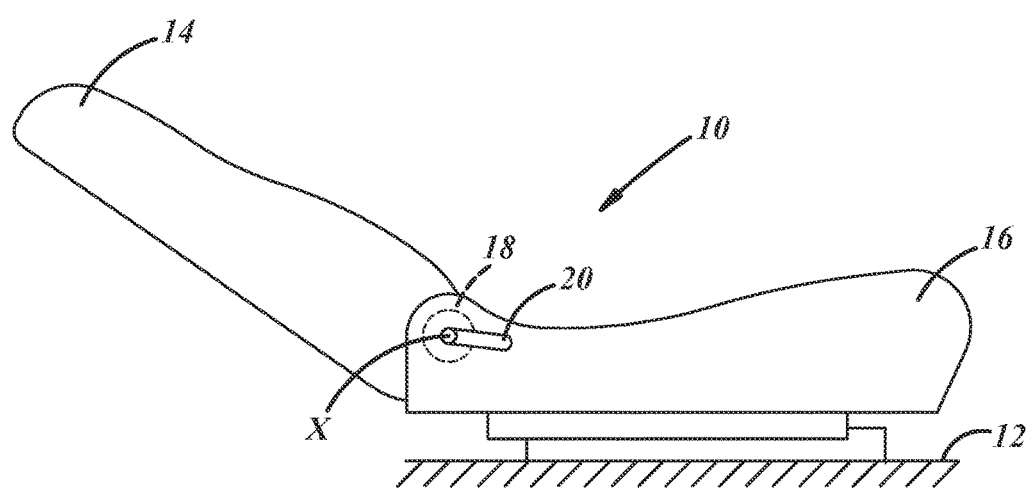
FIG. 2 is the side view of the vehicle seat of FIG. 1 with the seat back in a reclined position.

In this example, the locking mechanism 18 is a recliner mechanism known in the art that is actuated by a user via a handle 20 along one side of the seat 10. In this arrangement, the seat bottom 16 remains stationary while the seat back 14 is free to pivot about the pivot axis X in a reclining direction R and a return or forward direction F when the recliner mechanism 18 is moved into the unlocked position by the user via the handle 20. FIG. 1 illustrates the seat back 14 in an upright position, and FIG. 2 illustrates the seat back in one of a plurality of possible reclined positions. In some embodiments, the seat back 14 can be moved in the forward direction F beyond the upright position of FIG. 1 and/or into a fold-flat position in which the seat back 14 lies horizontal against the seat bottom 16. In other examples, the seat back 14 is stationary and movement of the locking mechanism to the unlocked position allows the seat bottom 16 to pivot up toward the seat back.

Figure 3:
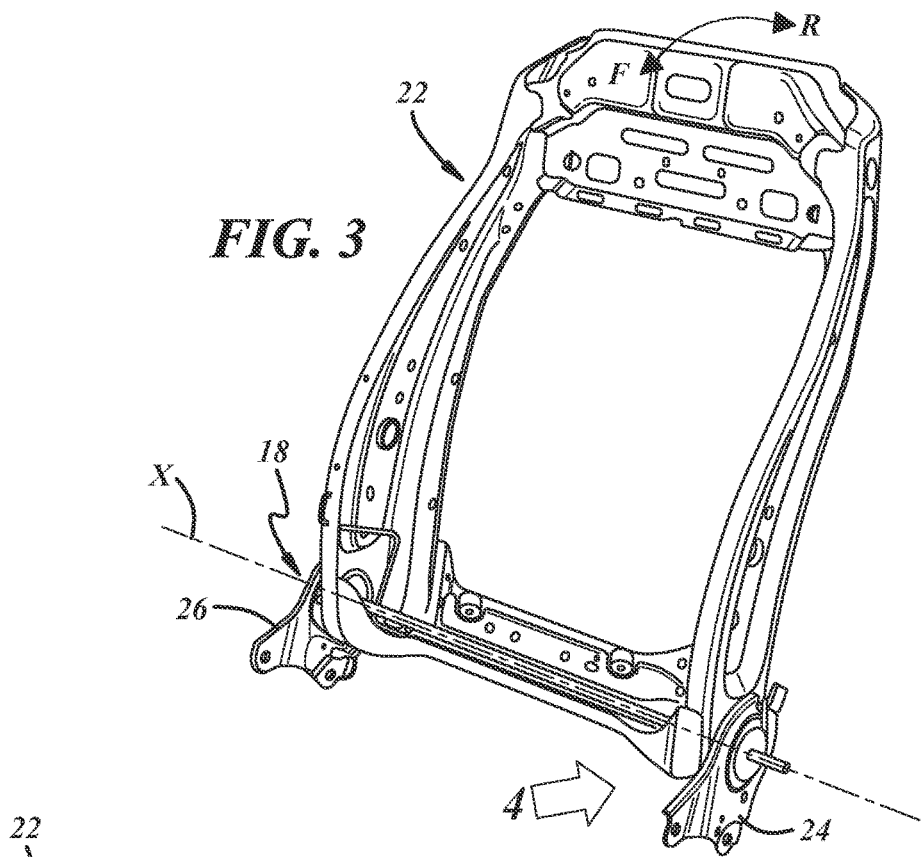
FIG. 3 is a perspective view of a seat back frame with an attached recliner mechanism and torsion bar.

Each of the seat back 14 and the seat bottom 16 may include a structural frame underlying visible seat covering surfaces. An illustrative seat back frame 22 is illustrated in FIG. 3. The illustrated frame 22 is shown with the recliner mechanism 18 mounted thereto, along with a pair of brackets 24, 26 adapted to be mounted to the seat bottom or a frame of the seat bottom (not shown in FIG. 3).

Figure 4:
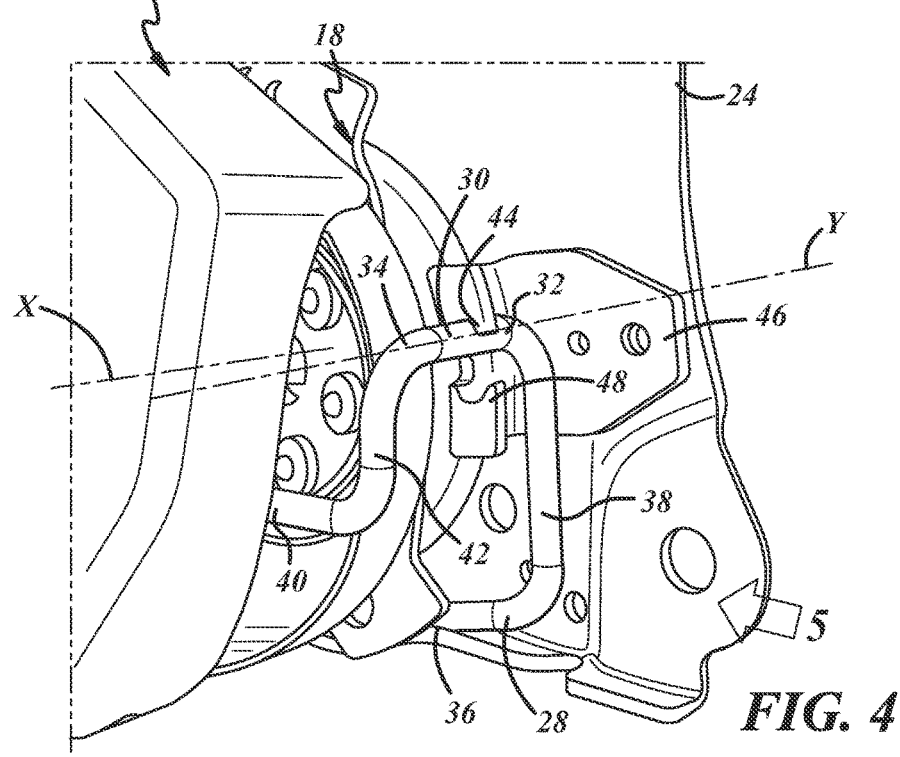
FIG. 4 is an enlarged view of a portion of FIG. 3 showing the torsion bar in greater detail.

The seat also includes a torsion bar 28, a portion of which is illustrated in FIG. 4, which is a perspective view of a portion of the seat back frame 22 as viewed in the indicated direction of FIG. 3. The torsion bar 28 is configured to bias the seat back 14 toward the seat bottom about the pivot axis X when the torsion bar 28 is in a loaded condition. In the example in the figures, movement of the seat back 14 in the reclining direction R increases the load on the torsion bar 28 (i.e., increases the amount of energy stored in the torsion bar) such that, when the seat back is in a reclined position, such as in FIG. 2, changing the recliner mechanism 18 from the locked to the unlocked position causes the seat back 14 to move in the return or forward direction F without the need for the user to pull the seat back forward.

The torsion bar 28 includes a transverse portion 30 having opposite first and second ends 32, 34 spaced apart along a torsional axis Y. Both ends 32, 34 of the transverse portion 30 of the torsion bar 28 are located on the same side (i.e., inboard or outboard side) of the vehicle seat. As discussed further below, the torsional axis Y is advantageously non-parallel with respect to the pivot axis X.

The torsion bar 28 includes a first engagement portion 36 in a fixed position relative to the seat bottom and radially spaced from the torsional axis Y by a first lever arm 38 extending from the first end 32 of the transverse portion 30 of the torsion bar. In this example, the first engagement portion 36 is one end of the torsion bar 28 that bears against the bracket 24 when the torsion bar is in the loaded condition and thereby in a fixed position relative to the seat bottom. The engagement portion 36 may be fixed relative to the seat bottom by friction when the torsion bar 28 is loaded or by otherwise being affixed to the seat bottom or to another seat component that is stationary relative to the seat bottom. The first lever arm 38 is perpendicular to the pivot axis X in this example.

The torsion bar 28 includes a second engagement portion 40 in a fixed position relative to the seat back 14 and radially spaced from the torsional axis Y by a second lever arm 42 extending from the second end 34 of the transverse portion 30 of the torsion bar. The point of engagement of the second engagement portion 40 is not shown explicitly in FIG. 4, as it could be any portion along the torsion bar 28 that bears against the seat back 14 or some other seat component having a fixed position relative to the seat back when the torsion bar is in the loaded condition. For example, the second engagement portion 40 could be another end of the torsion bar 28 opposite the illustrated end 36; or it could be some portion of the torsion bar affixed or otherwise bearing against the seat back 14 between opposite ends of the torsion bar. In this example, the second lever arm 42 is perpendicular to the pivot axis X such that it is parallel with the first lever arm 38. In the particularly illustrated example, the transverse portion 30 of the torsion bar 28, together with the first and second lever arms 38, 42, form a U-shaped section of the torsion bar, with the lever arms being spaced apart in the transverse direction, parallel to each other, and oriented in the same direction.

As shown in FIG. 4, the vehicle seat may also include a hook 44 that partially surrounds and engages the transverse portion 30 of the torsion bar 28. The hook 44 is configured to radially constrain the transverse portion 30 of the torsion bar 28 when the torsion bar is in the loaded condition. The hook 44 is stationary with respect to whichever of the seat back 14 or seat bottom 16 is stationary during their relative pivotal movement. In this case, the hook 44 is part of a hook piece 46 that includes an opposing hook 48 such that the hook piece 44 can be inverted for use on the opposite side of the seat with bracket 26 (FIG. 3). The hook piece 46 and hook 44 thus extend from the bracket 24. In other examples, the hook 44 is made as an integral part of the bracket 24 or the seat bottom frame from a single piece of material.

Figure 5:
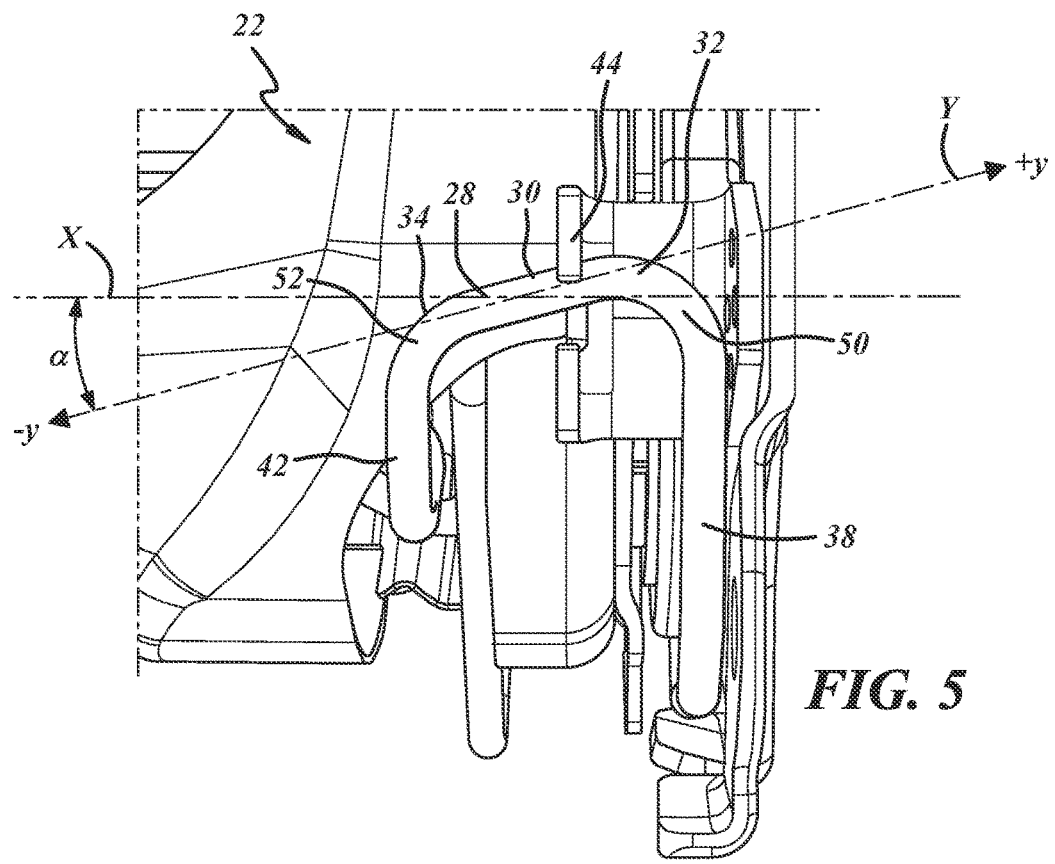
FIG. 5 is a front view of the torsion bar of FIG. 4.

FIG. 5 is a front view of the portion of the seat back frame 22 and torsion bar 28 as viewed in the indicated direction of FIG. 4. As noted above, the transverse portion 30 of the torsion bar 28, including the torsional axis Y thereof, is not parallel to the pivot axis X of the seat. In particular, the torsional axis Y forms a non-zero angle $\alpha$ with the transverse pivot axis X. This configuration advantageously prevents disengagement of the torsion bar 28 from the hook 44 that may otherwise occur if the torsional and transverse axes Y, X were parallel. It has been found that, while the transverse portion 30 of the torsion bar 28 may be designed to accommodate the torsional forces generated when the torsion bar is loaded (i.e., when the lever arms 38, 42 are rotated in opposite rotational directions), such forces cause twisting and/or other movement along the length of the torsion bar 28 beyond the transverse portion.

In the particularly illustrated example, when the torsion bar 28 is in the loaded condition, increasing load tends to cause the transverse portion 30 to move in the direction of the torsional axis Y in a direction (−Y in FIG. 5) from the first end 32 toward the second end 34 of the transverse portion. Properly configured with a non-zero angle $\alpha$ between the axes X, Y as shown, this tendency for movement is prevented. In fact, with increased torsional loading of the torsion bar 28 with a non-zero angle $\alpha$, there is an increase in the amount of engagement force between the hook 44 and the torsion bar as the direction of movement of the transverse portion 30 wedges the transverse portion further into the hook 44. Without this prevention of movement, the first lever arm 38 would tilt with respect to the vertical direction of FIG. 5 and become non-perpendicular, eventually resulting in disengagement of the transverse portion 30 from the hook 44 and loss of the desired biasing force. The non-zero angle α also ensures a snug fit between the torsion bar 28 and the hook 44 when, for example, the torsion bar is configured to have a nominal non-zero loading even in the fully forward position. This can help reduce or eliminate rattles or noise sometimes encountered with conventional vehicle seat torsion bars. Skilled artisans will recognize other advantages once they are in possession of these teachings.

The torsion bar 28 may thus be configured so that the magnitude of the angle α is sufficient to prevent disengagement of the torsion bar 28 and, in particular, the transverse portion 30 of the torsion bar from the hook 44. In various embodiments, the angle α is in a range between 0.5 degrees and 45 degrees, between 5 degrees and 45 degrees, between 5 degrees and 30 degrees, between 5 degrees and 15 degrees, between 10 degrees and 45 degrees, between 10 degrees and 30 degrees, or between 15 and 30 degrees, to name a few exemplary ranges.

In the illustrated example, the torsion bar 28 is a bent metal wire or rod having a circular cross-section along its length and between the first end 36 and an opposite second end. The torsion bar 28 may be economically formed by providing a plurality of bends along the length of a piece of wire of the desired diameter. Examples of such bends in FIG. 5 include one bend 50 located where the first end 32 of the transverse portion 30 joins the first lever arm 38, and another bend 52 located where the second end 34 of the transverse portion joins the second lever arm 42. The torsion bar 28 may include any number of additional bends and/or one or both of the illustrated bends 50, 52 may be omitted.

Figure 6:
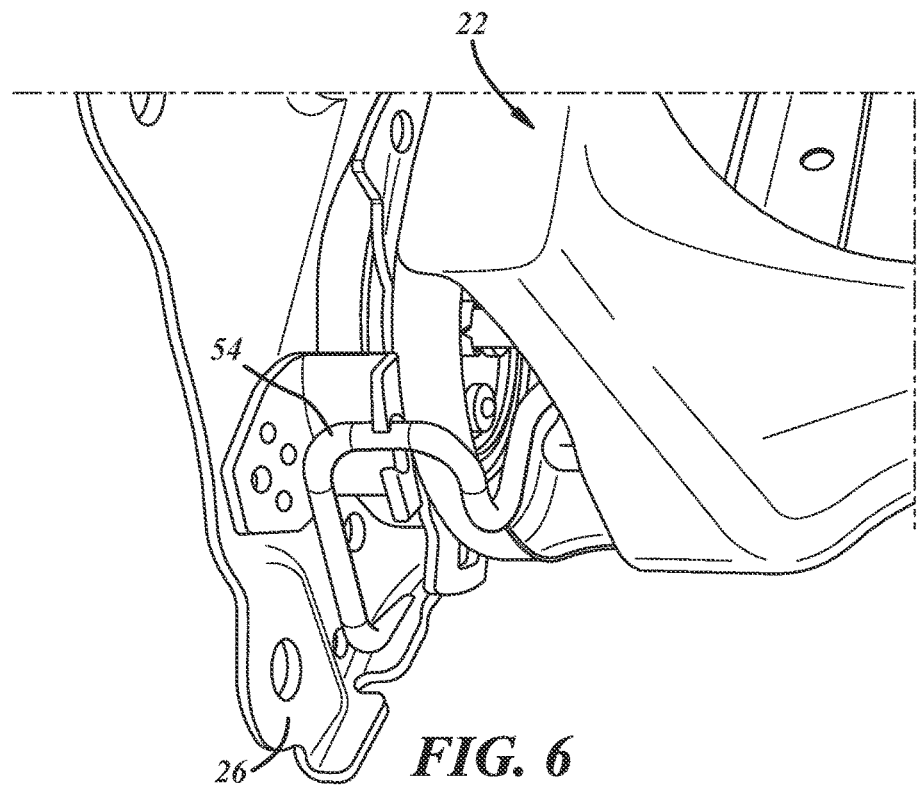
FIG. 6 is another torsion bar portion on the opposite side of the vehicle seat from the portion illustrated in FIGS. 4 and 5.

FIG. 6 illustrates another torsion bar portion 54 on the opposite side of the seat back 14 from that shown in FIG. 4. The illustrated portion 54 is configured in the same manner as that shown in the previous figures and may be part of the same torsion bar 26 of FIG. 4 with a central portion extending transversely between the second engagement portion 40 of FIG. 4 and the illustrated portion 54 of FIG. 6. Or the torsion bar portion 54 of FIG. 6 may be part of a separately formed second torsion bar that moves separately from the torsion bar described above.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A vehicle seat having opposite inboard and outboard sides, the vehicle seat comprising:
    a seat back pivotably coupled with a seat bottom by a locking mechanism for relative movement toward and away from each other about a transverse pivot axis, wherein the locking mechanism is changeable between a locked position, in which the locking mechanism prevents the seat back and seat bottom from moving relative to each other, and an unlocked position, in which the locking mechanism allows the seat back and seat bottom to freely move relative to each other; and
    a torsion bar that biases the seat back toward the seat bottom about the pivot axis when in a loaded condition, the torsion bar comprising:
        a transverse portion having opposite first and second ends spaced apart along a torsional axis;
        a first engagement portion in a fixed position relative to the seat bottom and radially spaced from the torsional axis by a first lever arm extending from the first end of the transverse portion of the torsion bar; and
        a second engagement portion in a fixed position relative to the seat back and radially spaced from the torsional axis by a second lever arm extending from the second end of the transverse portion of the torsion bar,
    wherein the torsional axis forms an angle with the transverse pivot axis, said angle being in a range between 0.5 degrees and 45 degrees.

2. A vehicle seat as defined in claim 1, further comprising a hook that partially surrounds and engages the transverse portion of the torsion bar to radially constrain the transverse portion of the torsion bar when the torsion bar is in the loaded condition.

3. A vehicle seat as defined in claim 2, wherein the torsional axis forms an angle with the transverse pivot axis such that movement of the transverse portion of the torsion bar in a direction from the first to the second end of said transverse portion increases an amount of engagement force between the hook and the torsion bar.

4. A vehicle seat as defined in claim 2, wherein the torsional axis forms an angle with the transverse pivot axis sufficient to prevent disengagement of the torsion bar from the hook.

5. A vehicle seat as defined in claim 1, wherein the locking mechanism is a recliner mechanism mounted to the seat bottom via a bracket.

6. A vehicle seat as defined in claim 5, wherein the first engagement portion of the torsion bar is a first end of the torsion bar that bears against the bracket when the torsion bar is in the loaded condition.

7. A vehicle seat as defined in claim 6, further comprising a hook that extends from the bracket and partially surrounds and engages the transverse portion of the torsion bar to radially constrain the transverse portion of the torsion bar when the torsion bar is in the loaded condition.

8. A vehicle seat as defined in claim 5, wherein movement of the seat back in a reclining direction away from the seat bottom increases the load on the torsion bar such that, when the seat back is in a reclined position, changing the recliner mechanism from the locked to the unlocked position causes the seat back to move in a return direction toward the seat bottom.

9. A vehicle seat as defined in claim 1, wherein both ends of the transverse portion of the torsion bar are located on the same inboard or outboard side of the vehicle seat.

10. A vehicle seat as defined in claim 1, wherein each of the first and second lever arms are perpendicular to the transverse pivot axis.

11. A vehicle seat as defined in claim 1, wherein the torsion bar is a metal wire with a plurality of bends formed along the length of the wire, one of the bends being located where the first end of the transverse portion joins the first lever arm, and another of the bends being located where the second end of the transverse portion joins the second lever arm.

12. A vehicle seat as defined in claim 1, wherein the first and second lever arms are parallel with each other and oriented in the same direction.

13. A vehicle seat having opposite inboard and outboard sides, the vehicle seat comprising:
    a seat back pivotably coupled with a seat bottom by a locking mechanism for relative movement toward and away from each other about a transverse pivot axis, wherein the locking mechanism is changeable between a locked position, in which the locking mechanism prevents the seat back and seat bottom from moving relative to each other, and an unlocked position, in which the locking mechanism allows the seat back and seat bottom to freely move relative to each other; and
    a torsion bar that biases the seat back toward the seat bottom about the pivot axis when in a loaded condition, the torsion bar comprising:
        a transverse portion having opposite first and second ends spaced apart along a torsional axis;
        a first engagement portion in a fixed position relative to the seat bottom and radially spaced from the torsional axis by a first lever arm extending from the first end of the transverse portion of the torsion bar; and
        a second engagement portion in a fixed position relative to the seat back and radially spaced from the torsional axis by a second lever arm extending from the second end of the transverse portion of the torsion bar,
    the vehicle seat further comprising a hook that partially surrounds and engages the transverse portion of the torsion bar to radially constrain the transverse portion of the torsion bar when the torsion bar is in the loaded condition,
    wherein the torsional axis forms an angle with the transverse pivot axis such that movement of the transverse portion of the torsion bar in a direction from the first to the second end of said transverse portion increases an amount of engagement force between the hook and the torsion bar.

14. A vehicle seat as defined in claim 13, wherein the locking mechanism is a recliner mechanism mounted to the seat bottom via a bracket and the first engagement portion of the torsion bar bears against the bracket when the torsion bar is in the loaded condition.

15. A vehicle seat as defined in claim 13, wherein both ends of the transverse portion of the torsion bar are located on the same inboard or outboard side of the vehicle seat.

16. A vehicle seat as defined in claim 13, wherein at least one of the first and second lever arms is perpendicular to the transverse pivot axis and not perpendicular to the torsional axis.

17. A vehicle seat having opposite inboard and outboard sides, the vehicle seat comprising:
    a seat back pivotably coupled with a seat bottom by a locking mechanism for relative movement toward and away from each other about a transverse pivot axis, wherein the locking mechanism is changeable between a locked position, in which the locking mechanism prevents the seat back and seat bottom from moving relative to each other, and an unlocked position, in which the locking mechanism allows the seat back and seat bottom to freely move relative to each other; and
    a torsion bar that biases the seat back toward the seat bottom about the pivot axis when in a loaded condition, the torsion bar comprising:
        a transverse portion having opposite first and second ends spaced apart along a torsional axis;
        a first engagement portion in a fixed position relative to the seat bottom and radially spaced from the torsional axis by a first lever arm extending from the first end of the transverse portion of the torsion bar; and
        a second engagement portion in a fixed position relative to the seat back and radially spaced from the torsional axis by a second lever arm extending from the second end of the transverse portion of the torsion bar,
    the vehicle seat further comprising a hook that partially surrounds and engages the transverse portion of the torsion bar to radially constrain the transverse portion of the torsion bar when the torsion bar is in the loaded condition,
    wherein the torsional axis forms an angle with the transverse pivot axis sufficient to prevent disengagement of the torsion bar from the hook.

18. A vehicle seat as defined in claim 17, wherein the locking mechanism is a recliner mechanism mounted to the seat bottom via a bracket and the first engagement portion of the torsion bar bears against the bracket when the torsion bar is in the loaded condition.

19. A vehicle seat as defined in claim 17, wherein both ends of the transverse portion of the torsion bar are located on the same inboard or outboard side of the vehicle seat.

20. A vehicle seat as defined in claim 17, wherein at least one of the first and second lever arms is perpendicular to the transverse pivot axis and not perpendicular to the torsional axis.

* * * * *